United States Patent
Karande et al.

(10) Patent No.: US 8,589,472 B2
(45) Date of Patent: Nov. 19, 2013

(54) AGENT SYSTEM FOR REDUCING SERVER RESOURCE USAGE

(75) Inventors: Advait Deepak Karande, Singapore (SG); Chee Meng Low, Singapore (SG); Nandagopal Seshagiri, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 12/820,179

(22) Filed: Jun. 22, 2010

(65) Prior Publication Data

US 2011/0314079 A1    Dec. 22, 2011

(51) Int. Cl.
*G06F 15/16* (2006.01)

(52) U.S. Cl.
USPC .......................................................... 709/202

(58) Field of Classification Search
None
See application file for complete search history.

(56) References Cited

U.S. PATENT DOCUMENTS

| | | | |
|---|---|---|---|
| 7,441,025 B2 | 10/2008 | Felt et al. | |
| 7,506,070 B2 * | 3/2009 | Tran et al. | 709/246 |
| 7,669,186 B2 | 2/2010 | Nolan et al. | |
| 2007/0050484 A1 | 3/2007 | Oertig et al. | |
| 2007/0174410 A1 * | 7/2007 | Croft et al. | 709/208 |
| 2010/0050004 A1 * | 2/2010 | Hamilton et al. | 713/320 |
| 2010/0088743 A1 * | 4/2010 | Hayashida | 726/1 |
| 2010/0106804 A1 | 4/2010 | He et al. | |

OTHER PUBLICATIONS

Buecker et al., "A Guide to Authentication Services in IBM Security Access Manager for Enterprise Single Sign-On," International Business Machines Corporation, ibm.com, Feb. 16, 2012, 38 pages.
"IBM Tivoli Access Manager for Enterprise Single Sing-On: An Overview," International Business Machines Corporation, White Paper, Dec. 2008, 16 pages.

* cited by examiner

*Primary Examiner* — Scott Christensen
(74) *Attorney, Agent, or Firm* — Yee & Associates, P.C.; Jeffrey S. LaBaw

(57) ABSTRACT

A method, data processing system, and computer program product for processing information. A server-side agent running on a server data processing system monitors for a selected event for processing by the server-side agent. In response to detecting the selected event for processing by the server-side agent, the server-side agent requests information to process the selected event from a client-side agent running on a client data processing system. The server-side agent performs a subset of functions performed by the client-side agent. In response to receiving a response with the information to process the selected event from the client-side agent, the server-side agent performs a set of steps to process the selected event using the information received from the client-side agent.

25 Claims, 6 Drawing Sheets

AGENT SYSTEM FOR REDUCING SERVER RESOURCE USAGE

BACKGROUND

1. Field

The present disclosure relates generally to data processing systems and, in particular, to a method and apparatus for processing data. Still more particularly, the present disclosure relates to a method and apparatus for reducing the use of resources on server data processing systems.

2. Description of the Related Art

In network data processing systems, a number of different paradigms are present for the manner in which data or other information is processed. For example, in many network data processing systems, applications are run on the client data processing systems. Server data processing systems provide access to documents, spreadsheets, databases, and other information.

In other network data processing systems, applications may run on a server data processing system. The client data processing systems are used as an interface to interact with the applications running on the server. For example, a word processing program runs on the server, while the user interacts with the word processing program on the client. A web browser or other client application may be used to interact with the word processing program running on the server data processing system. This type of computing may take a number of different forms.

For example, server-based computing may be in the form of terminal sessions or virtual desktops. The terminal session is an interaction between a client data processing system and an application running on a server. A virtual desktop is an environment in which a user's interface is stored on a remote server data processing system rather than locally on a client data processing system in which the user works. With server-based computing environments, it is not unusual to have a user access multiple applications or desktops that are running on different server data processing systems. For example, a user may use a client data processing system to access an application or an entire desktop running on one or more remote data processing systems.

In conjunction with the use of server-based computing, increased agent software is used to counteract unauthorized access to different computers in a network data processing system. For example, these agents may include anti-malware agents for protecting against viruses, and other malware. Single sign-on agents are employed for automatically logging on to applications and navigating applications. Data leakage protection agents are often used to identify information that should not be transmitted or accessed. Other agents are employed to synchronize the state information across different applications.

These types of agents run on both server data processing systems and client data processing systems. Typically, an agent runs both on the server data processing system and the client data processing system. The agent runs on the server data processing system within the virtual desktop or session. For example, with a single sign-on agent, the agent running on the server data processing system provides single sign-on services for different applications running in a virtual desktop that are accessed by a user. The agent on the client data processing system performs single sign-on services for any applications that may run on the client data processing system.

SUMMARY

The different illustrative embodiments provide a method, data processing system, and computer program product for processing information. A server-side agent running on a server data processing system monitors for a selected event for processing by the server-side agent. In response to detecting the selected event for processing by the server-side agent, the server-side agent requests information to process the selected event from a client-side agent running on a client data processing system. The server-side agent performs a subset of functions performed by the client-side agent. In response to receiving a response with the information to process the selected event from the client-side agent, the server-side agent performs a set of steps to process the selected event using the information received from the client-side agent.

DETAILED DESCRIPTION

Figure 1:
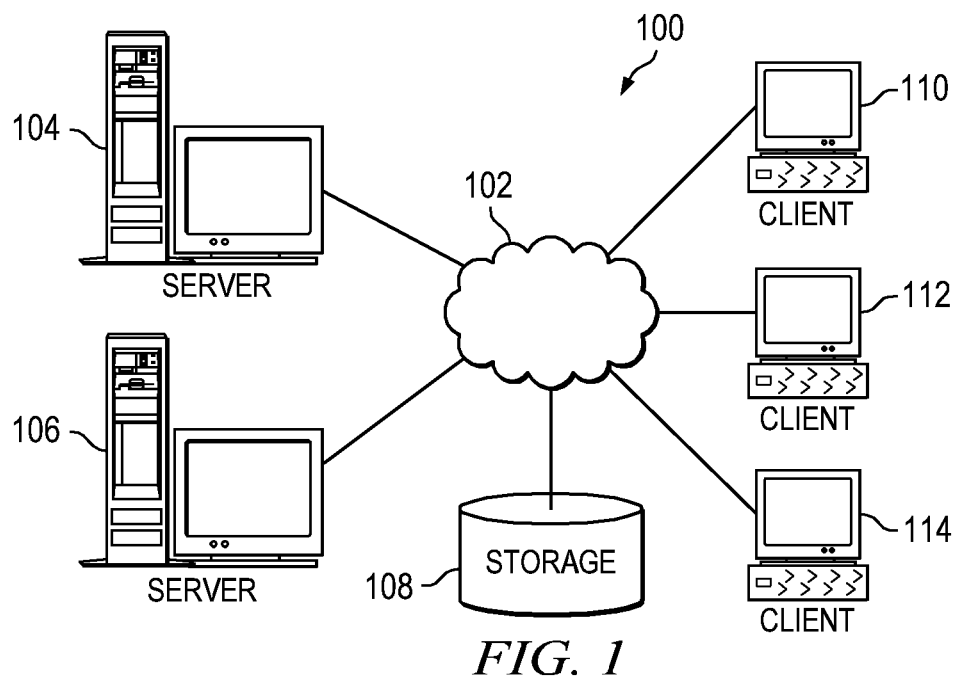
FIG. 1 is an illustrative diagram of a data processing environment in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device.

Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction processing system, apparatus, or device. The computer usable medium may include a propagated data signal with the computer usable program code embodied therewith, either in baseband or as part of a carrier wave. The computer usable program code may be transmitted using any appropriate medium, including, but not limited to, wireless, wireline, optical fiber cable, RF, etc.

Computer program code for carrying out operations of the present invention may be written in any combination of one or more programming languages, including an object-oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
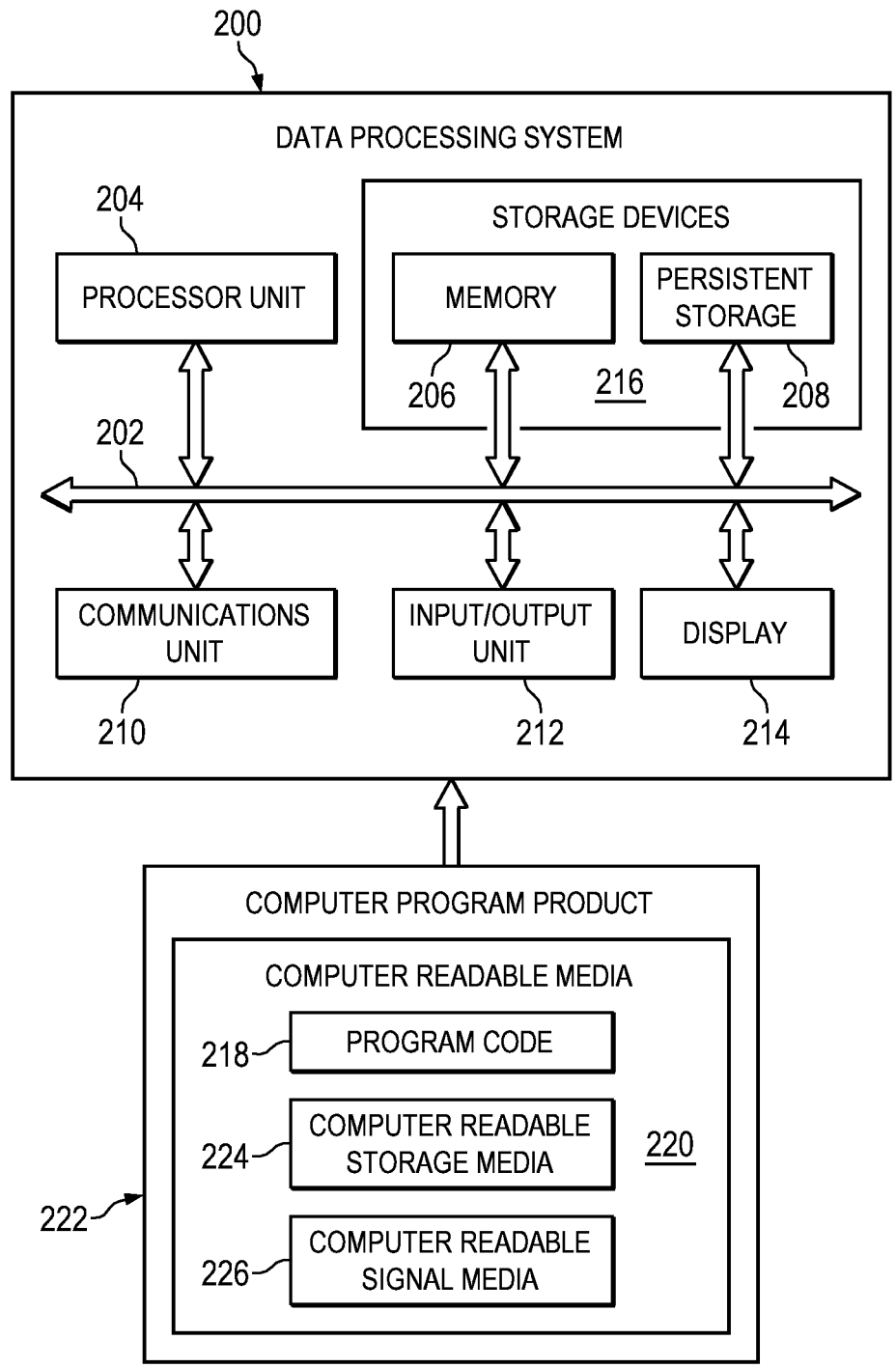
FIG. 2 is a diagram of a data processing system in accordance with an illustrative embodiment.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Data processing system 200 is an example of a data processing system that may be used to implement server computers and client computers in network data processing system 100 in FIG. 1.

Processor unit 204 serves to execute instructions for software that may be loaded into memory 206. Processor unit 204 may be a set of one or more processors or a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 or run by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 run by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server data processing system, a client data processing system, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different illustrative embodiments recognize and take into account a number of considerations. For example, the different illustrative embodiments recognize and take into account that with increasing use of agents for performing operations remotely from a client data processing system, undesired use of processing resources may occur on the server data processing systems. In one example, many instances of agent processes may run on different operating system sessions on server data processing systems. These agent processes run in addition to agent processes running on client data processing systems.

This situation occurs because each remote desktop or application is hosted within an operating system session. Each of these sessions often requires the same set of agent processes to provide the same protection and desired compliance with policies as found on the client data processing systems. As a result, the same set of agent processes are run on the operating system hosted on the server data processing systems as well as on the client data processing systems.

The different illustrative embodiments also recognize and take into account that this duplication of agent processes on server data processing systems may result in an undesired reduction in the availability of processing resources. For example, each agent process has a memory footprint. In other words, each agent process takes up some amount of memory. For example, a single sign-on agent may use 70 megabytes, while an antivirus scanner agent may use 100 megabytes.

As the amount of memory used by all these agents is multiplied by the number of sessions hosted on the server data processing system, the amount of memory used on the server data processing system may increase. This increase in memory usage extends to both physical memory and virtual memory.

As a result, undesired effects on the capacity and performance of server data processing systems may occur. For example, a server data processing system may have a reduction in the capacity that is more than half. As a result, additional server data processing systems may be deployed to provide the desired performance and capacity. This type of situation results in increased costs and operating expenses, as well as instances in which users may be unable to obtain the desired performance or access to their applications.

Additionally, the different illustrative embodiments recognize and take into account that each agent running on a server data processing system takes time to initialize. For example, time is needed to load the information needed to perform the function and to determine whether changes to local copies of the information need to be updated from remote servers. Data, such as antivirus signatures, single sign-on specifications, single sign-on scripts, and/or other suitable information, may be loaded into the memory of the server data processing system. Additionally, the agent also may determine whether updates to this information are present from another source. If updates are needed, the agent downloads these updates and processes them for use.

These and other activities performed by an agent running on a server data processing system increase the time needed to access applications and desktops on a server data processing system. As a result, a negative impact may occur with respect to user experience when using these types of network data processing systems.

The different illustrative embodiments recognize and take into account that agent processes also run on client data processing systems. The different illustrative embodiments recognize and take into account that some of the processes and functions may be performed on the client data processing system and not on the server data processing system. For example, an agent process on a server data processing system may rely on accessing information located on the client data processing system. Additionally, the agent on the server data processing system may rely on the agent process on the client data processing system to make the same updates.

Thus, the different illustrative embodiments provide a method and apparatus for processing information. A server-side agent running on a server data processing system monitors for a selected event for processing by the server-side agent. In response to detecting a selected event for processing by the server-side agent, the server-side agent requests information to process the selected event from a client-side agent running on a client data processing system. The server-side agent performs a subset of functions performed by the client-side agent. In response to receiving a response with the information resulting from processing the request, the server-side agent performs a set of steps to process the selected event using the information received from the client-side agent.

Figure 3:
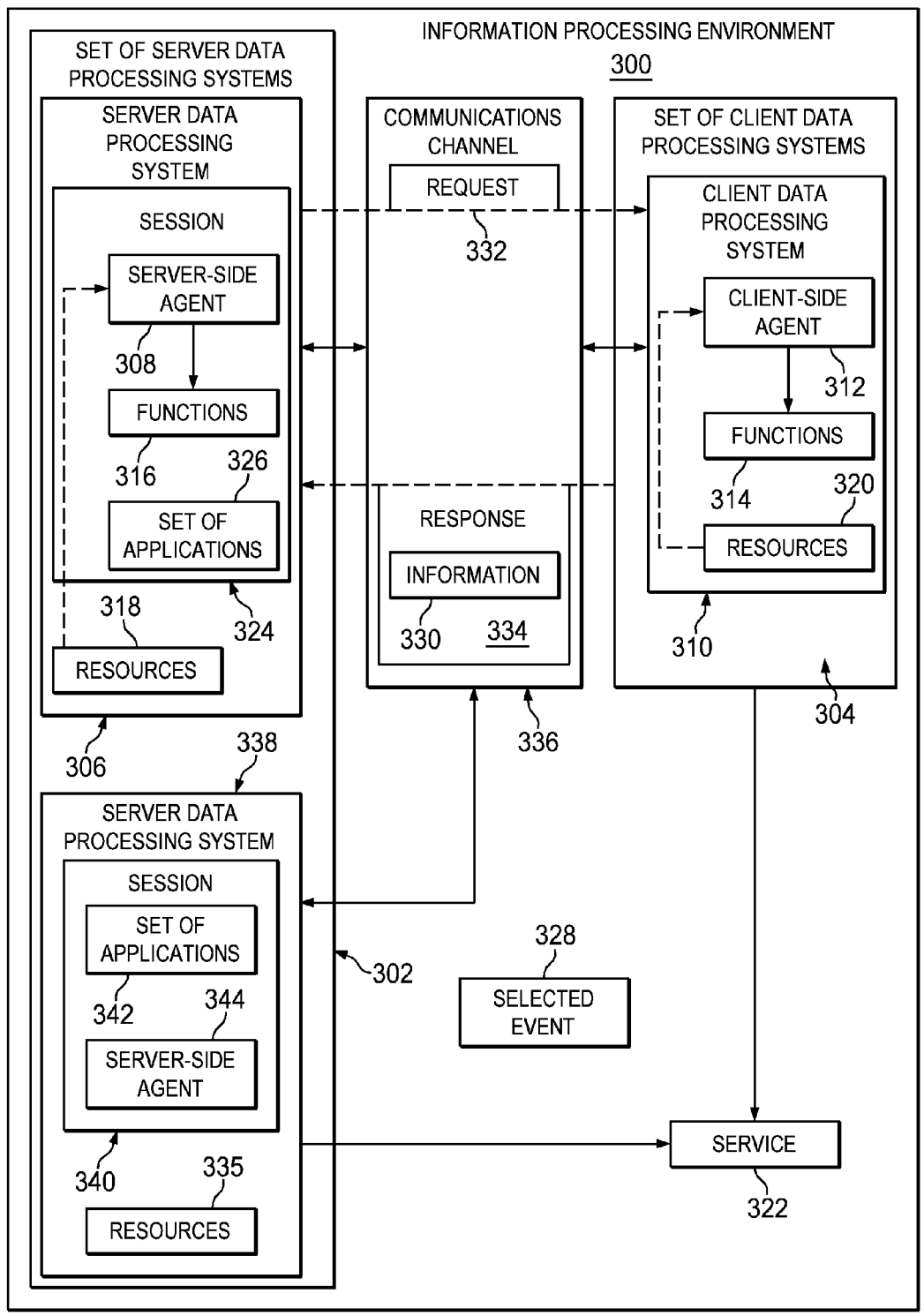
FIG. 3 is an illustration of an information processing environment in accordance with an illustrative embodiment.

With reference now to FIG. 3, an illustration of an information processing environment is depicted in accordance with an illustrative embodiment. Information processing environment 300 may be implemented using a network data processing system, such as network data processing system 100 in FIG. 1. In this example, information processing environment 300 includes set of server data processing systems 302 and set of client data processing systems 304. The phrase "a set of," as used herein with reference to items, means one or more items. For example, a set of server data processing systems is one or more server data processing systems.

Each of set of server data processing systems 302 may be implemented using data processing system 200 in FIG. 2. Each of set of client data processing systems 304 also may be implemented using data processing system 200 in FIG. 2. In these illustrative examples, set of client data processing systems 304 may take a number of different forms. For example, set of client data processing systems 304 may include a desktop computer, a laptop computer, a mobile phone, and/or other suitable types of data processing systems.

As depicted in this example, set of server data processing systems 302 includes server data processing system 306. Further, set of client data processing systems 304 includes client data processing system 310.

In one illustrative example, server data processing system 306 runs server-side agent 308. Client data processing system 310 runs client-side agent 312. Client-side agent 312 performs functions 314. Server-side agent 308 performs functions 316. In these illustrative examples, server-side agent 308 uses resources 318 to perform functions 316. Client-side agent 312 uses resources 320 to perform functions 314. Functions 314 and functions 316 may be for service 322. Service 322, in these examples, may include, without limitation, a single sign-on service, a malware protection service, a data leakage protection service, and/or other suitable types of services. In these examples, service 322 is the work done by server-side agent 308 and client-side agent 312. Service 322 encompasses functions 314 and functions 316.

In this illustrative example, functions 316 are a subset of functions 314. Functions 314 and functions 316 may take the form of, for example, without limitation, processing logic functions, product functions, and/or other suitable types of functions. Server-side agent 308 performs a subset of functions 314. In other words, server-side agent 308 may be a light weight or smaller version of client-side agent 312. As one illustrative example, without limitation, functions 316 performed by server-side agent 308 may include all of the product functions in functions 314 by client-side agent 312 but only a portion of processing logic functions in functions 314. As a result, server-side agent 308 may not require as much program code as compared to client-side agent 312.

Further, server-side agent 308 may perform functions 316 in a manner that reduces the use of resources 318 in server data processing system 306. In these illustrative examples, functions 314 may use more of resources 320 in client data processing system 310 as compared to resources 318 in server data processing system 306.

In these illustrative examples, server-side agent 308 may run within session 324 on server data processing system 306. Session 324 may also run set of applications 326. In these illustrative examples, session 324 is an instance of software running on server data processing system 306. Session 324 may be created in response to a client activity, such as, for example, a client request, an application running on client data processing system 310, another server data processing system requiring a service for client data processing system 310, or some other suitable type of client activity. For example, without limitation, session 324 may be a terminal session, a virtual desktop session, a virtual machine session, or some other suitable type of session.

In these illustrative examples, server-side agent 308 monitors for selected event 328 for processing by server-side agent 308. This event may comprise, for example, without limitation, a file access, a request for credentials, an authorization request, a request for a user identifier and password, and/or other suitable types of events.

In response to detecting selected event 328, server-side agent 308 sends request 332 requesting information 330 from client-side agent 312. Client-side agent 312 processes request 332 to generate information 330 in these examples. The processing of request 332 may take a number of different forms. For example, without limitation, client-side agent 312 may access data stored on client data processing system 310. This data may include, for example, a policy, single sign-on (SSO) specifications, credentials for a user application, access control lists, virus signatures, and/or other suitable types of information.

Client-side agent 312 returns information 330 to server-side agent 308 in response 334. Server-side agent 308 then performs a set of steps to process selected event 328 using information 330 received from client-side agent 312. In these illustrative examples, server-side agent 308 and client-side agent 312 communicate with each other through communications channel 336 established between these two agents.

In this illustrative example, communications channel 336 may be a virtual communications channel established using, for example, a software development kit (SDK) provided by server data processing system 306. The software development kit allows the agents to use a network connection established between client data processing system 310 and in server data processing system 306. In particular, the software development kit allows a server-side agent and a client-side agent to establish a private communications channel over the same network connection used by the client application. This network connection may use a protocol, such as, for example, remote desktop protocol (RDP) or some other suitable protocol. Of course, communications channel 336 may be established as a separate communications channel.

As can be seen, by using client-side agent 312 to perform processing or store more information, a lower usage of resources 318 in server data processing system 306 occurs. These resources include, for example, without limitation, processor resources, memory, storage, and other suitable types of resources.

In addition, a user of client data processing system 310 may access more than one server data processing system in set of server data processing systems 302. For example, the user also may access server data processing system 338 on which session 340 runs set of applications 342. In these examples, server-side agent 344 also runs on server data processing system 338 in session 340.

With this type of implementation, the use of resources 335 in server data processing system 338 also may be reduced. For example, when server-side agent 308, server-side agent 344, and client-side agent 312 perform single sign-on services, server-side agent 308 and server-side agent 344 may detect events requiring information to sign on or sign into applications. This information may be stored in client data processing system 310. This information may include, for example, user identifiers, passwords, policies, and other suitable information for single sign-on functions.

Client-side agent 312 may access this information and provide this information to server-side agent 308 and server-side agent 344. In this manner, the information may be stored in only one location, in client data processing system 310. As a result, data duplication is reduced, reducing the amount of resources needed to store information.

For example, if server-side agent 308 and server-side agent 344 both stored and maintained information needed to perform single sign-on services, the same data would be stored on both server data processing system 306 and server data processing system 338. In other words, the data would be duplicated. By having server-side agent 308 and server-side agent 344 request the information from client-side agent 312, the data is not duplicated, and resources 318 used by server-side agent 308 and resources 335 used by server-side agent 344 may be reduced. For example, processor resources needed to access policies, user identifiers, passwords, and/or other suitable information are not used on server data processing system 306 and server data processing system 338.

Further, faster access to server data processing system 306 and server data processing system 338 also may occur. For example, when server-side agent 308 and client-side agent 312 are initialized, client-side agent 312 may load information into memory for use. Additionally, client-side agent 312 also may determine whether updates are present for the information. These types of functions are not performed by server-side agent 308.

Additionally, when a user accesses server data processing system 338, server-side agent 344 may initialize much more quickly because loading data and updating data is not performed by server-side agent 344. Further, by not performing these processes on set of server data processing systems 302, less processor resources are used and/or quicker access is provided to users.

The illustration of information processing environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, additional server data processing systems in addition to server data processing system 306 and server data processing system 338 may be present in set of server data processing systems 302. Further, additional client data processing systems in addition to client data processing system 310 may be present in set of client data processing systems 304.

Figure 4:
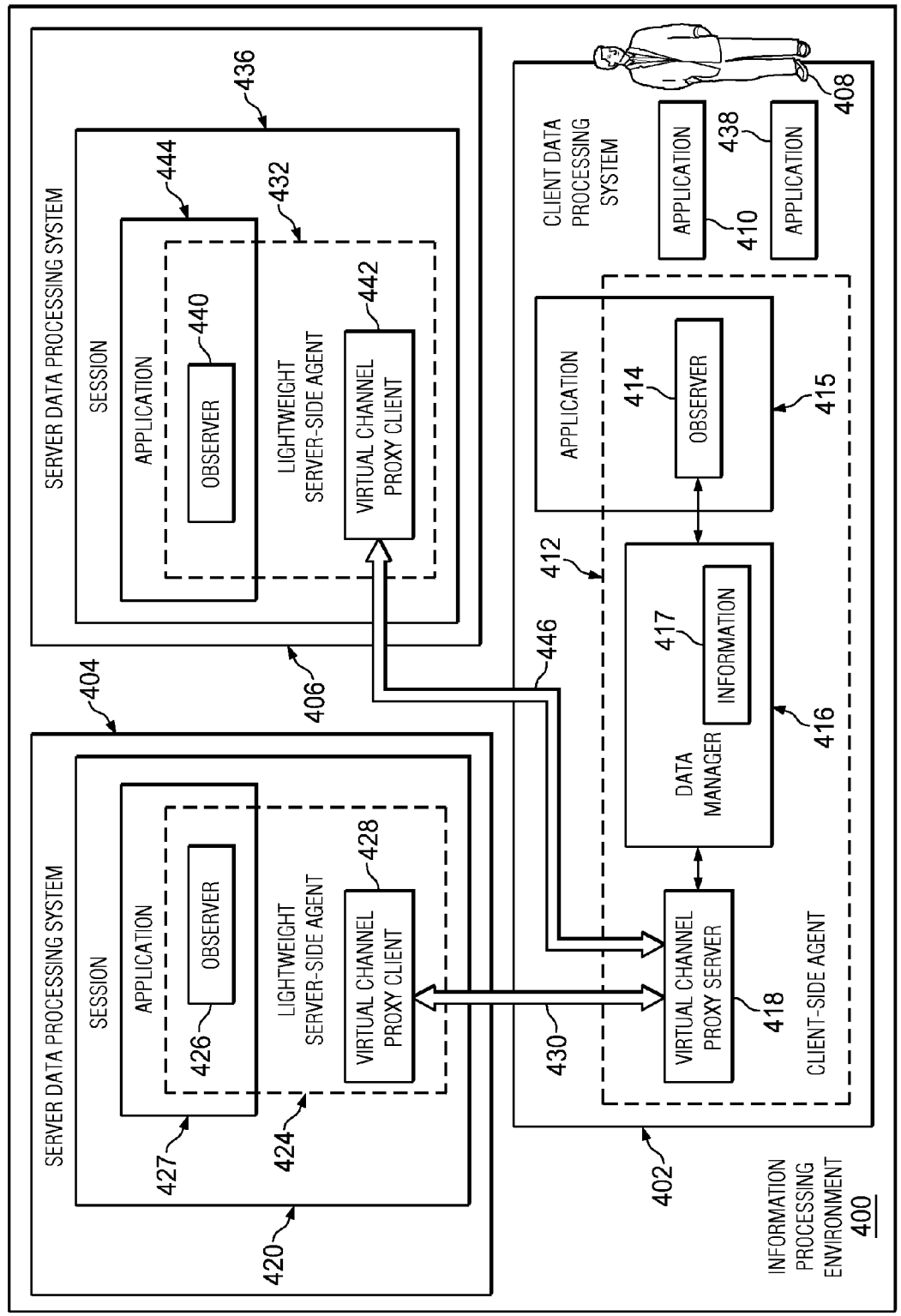
FIG. 4 is an illustration of an information processing environment in accordance with an illustrative embodiment.

With reference now to FIG. 4, an illustration of an information processing environment is depicted in accordance with an illustrative embodiment. In this illustrative example, information processing environment 400 is an example of one implementation for information processing environment 300 in FIG. 3.

As depicted, information processing environment 400 includes client data processing system 402, server data processing system 404, and server data processing system 406. Client data processing system 402 is an example of one implementation for a client data processing system in set of client data processing systems 304 in FIG. 3. Server data processing system 404 and server data processing system 406 are examples of implementations for server data processing systems in set of server data processing systems 302 in FIG. 3.

In this illustrative example, user 408 initializes application 410 on client data processing system 402. Client-side agent 412 runs on client data processing system 402 and performs functions for application 410 and/or other applications running on client data processing system 402. Client-side agent 412 includes observer 414, data manager 416, and virtual channel proxy server 418. Observer 414 may be program code that runs within application 415 in this illustrative example.

Observer 414 stores information 417 using data manager 416. This information may include user identifiers, passwords, a policy, a set of rules, and/or other suitable types of information. This information may be used for running client-side agent 412, running applications in client data processing system 402, and/or performing other suitable functions.

Data manager 416 performs a number of functions for client-side agent 412. For example, data manager 416 may store, manage, and/or process information 417. Additionally, data manager 416 may make decisions and perform functions based on information 417. For example, if information 417 does not include a user identifier and password for user 408 for application 410, data manager 416 may generate a prompt to prompt user 408 for a user identifier and password. In other illustrative examples, observer 414 may generate the prompt to prompt user 408 for the user identifier and password based on information 417 retrieved from data manager 416.

In this example, application 410 provides access to a virtual desktop on server data processing system 404. Initialization of application 410 on client data processing system 402 causes session 420 on server data processing system 404 to be created. In this illustrative example, session 420 is a virtual desktop session that provides an instance of application 410 on server data processing system 404. Lightweight server-side agent 424 runs in session 420 on server data processing system 404. Lightweight server-side agent 424 performs a subset of the functions that may be performed by client-side agent 412. In this manner, lightweight server-side agent 424 uses less resources in server data processing system 404 as compared to the resources in client data processing system 402 used by client-side agent 412.

In this illustrative example, lightweight server-side agent 424 includes observer 426 and virtual channel proxy client 428. Observer 426 monitors for events from applications running in session 420, such as application 427, when session 420 is created. Application 427 corresponds to application 410 running on client data processing system 402. Virtual channel proxy client 428 and virtual channel proxy server 418 provide communications using communications channel 430. Communications channel 430 is a virtual communications channel in this illustrative example.

Observer 426 in lightweight server-side agent 424 performs a subset of the functions performed by client-side agent 412. For example, observer 426 may wait for a selected event to occur. The selected event may be, for example, the creation of session 420, a file access, a request to perform a request to sign on, a request to enter a user identifier and password for an application, a request to access session 420, and/or some other suitable type of event. All of the information used for processing the selected event may not be stored in server data processing system 404.

In response to the selected event occurring, lightweight server-side agent 424 requests the information needed for processing the selected event from client-side agent 412. For example, lightweight server-side agent 424 sends a request using virtual channel proxy client 428 to client-side agent 412. This request is received by client-side agent 412 using virtual channel proxy server 418.

Client-side agent 412 processes this request and retrieves the requested information using data manager 416. For example, when the selected event is a request for a single sign on, the information retrieved may include a user identifier, a password, and a policy. In this illustrative example, client-side agent 412 sends this information in a response to lightweight server-side agent 424 through communications channel 430.

This information may then be processed by lightweight server-side agent 424 to process the selected event. In this manner, data duplication in server data processing system 404 and client data processing system 402 may be reduced. Further, fewer resources and less processing power may be used by lightweight server-side agent 424 as compared to a server-side agent than is required to store all information needed by lightweight server-side agent 424 in server data processing system 404.

In some illustrative examples, at least a portion of the information may be processed by client-side agent 412 and the processed information sent to lightweight server-side agent 424. In these illustrative examples, even less processing and even fewer resources may be used by lightweight server-side agent 424 to process the selected event.

In a similar manner, server data processing system 406 may have lightweight server-side agent 432 running in session 436 in server data processing system 406. Lightweight server-side agent 432 runs in session 436 when session 436 is created. Session 436 is created when user 408 initializes application 438 in client data processing system 402. Lightweight server-side agent 432 performs a subset of the functions performed by client-side agent 412. Lightweight server-side agent 432 includes observer 440 and virtual channel proxy client 442. Observer 440 monitors for events in applications running in session 436, such as application 444. Application 444 corresponds to application 438 in client data processing system 402. All of the information used for processing events in applications may not be stored in server data processing system 406. Lightweight server-side agent 432 communicates with client-side agent 412 to retrieve the information needed from information 417. This communication is provided by virtual channel proxy client 442.

Virtual channel proxy client 442 is in communication with virtual channel proxy server 418 using communications channel 446. Communications channel 446 is a virtual communications channel in this illustrative example.

In this manner, fewer resources and less processing power may be used by lightweight server-side agent 432 as compared to client-side agent 412. For example, less memory and processing power is needed in server data processing system 406 with lightweight server-side agent 432.

In this illustrative example, lightweight server-side agent 432 and lightweight server-side agent 424 initialize faster than client-side agent 412, because lightweight server-side agent 432 and lightweight server-side agent 424 do not have to load all of information 417. In other words, lightweight server-side agent 432 and lightweight server-side agent 424 take less time to load and run session 436 and session 420, respectively, as compared to client-side agent 412 on client data processing system 402.

Figure 5:
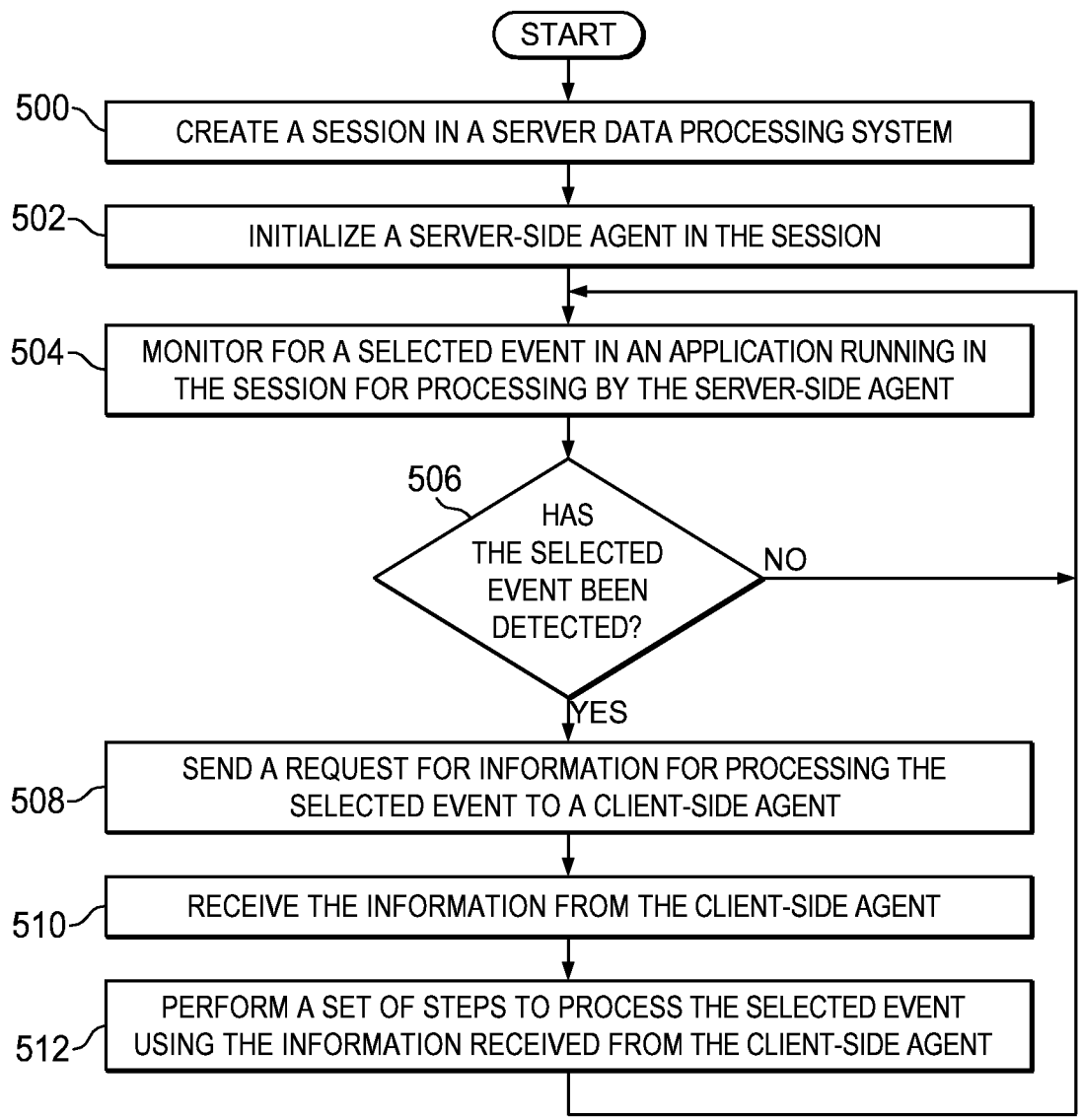
FIG. 5 is an illustration of a flowchart of a process for processing information in accordance with an illustrative embodiment.

With reference now to FIG. 5, an illustration of a flowchart of a process for processing information is depicted in accordance with an illustrative embodiment. The process illustrated in FIG. 5 may be implemented in information processing environment 300 in FIG. 3. In particular, this process may be implemented in server data processing system 306 in FIG. 3.

The process begins by creating a session in a server data processing system (step 500). Step 500 may be performed in the server data processing system in response to an application initializing in a client data processing system. The process then initializes a server-side agent in the session (step 502). The server-side agent may be in communication with a client-side agent running on the client data processing system.

Thereafter, the server-side agent monitors for a selected event in an application running in the session for processing by the server-side agent (step 504). The selected event may be a request to sign on, a file access, a request for a user identifier and password for an application, and/or some other suitable type of event. The server-side agent determines whether the selected event has been detected (step 506). If the selected event has not been detected, the process returns to step 504. Otherwise, the server-side agent sends a request for information for processing the selected event to a client-side agent (step 508).

Thereafter, the server-side agent receives the information from the client-side agent (step 510). The server-side agent then performs a set of steps to process the selected event using the information received from the client-side agent (step 512), with the process then returning to step 504, as described above. In step 512, the set of steps performed may include, for example, processing the information, updating the information, performing calculations using the information, making decisions based on the information, sending the information to a different data processing system, and/or other steps.

Figure 6:
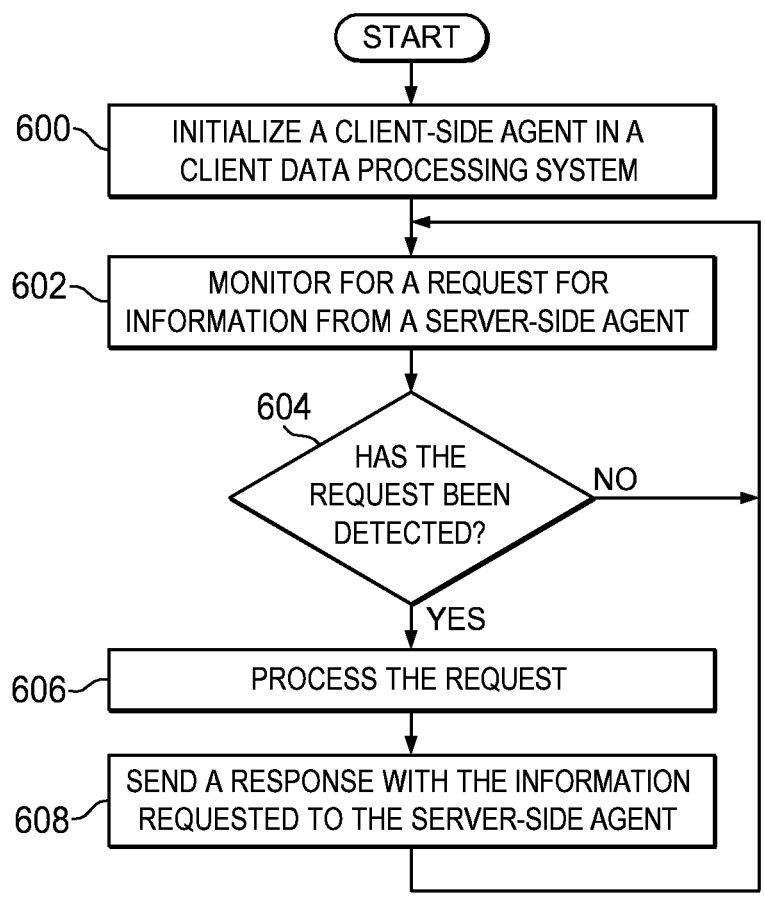
FIG. 6 is an illustration of a flowchart of a process for processing information in accordance with an illustrative embodiment.

With reference now to FIG. 6, an illustration of a flowchart of a process for processing information is depicted in accordance with an illustrative embodiment. The process illustrated in FIG. 6 may be implemented in information processing environment 300 in FIG. 3. In particular, this process may be implemented in client data processing system 310 in FIG. 3.

The process begins by initializing a client-side agent in a client data processing system (step 600). The client-side agent monitors for a request for information from a server-side agent (step 602). For example, the client-side agent may monitor for the request sent from a server-side agent in step 508 in FIG. 5.

Thereafter, the client-side agent determines whether the request has been detected (step 604). If a request has not been detected, the process returns to step 602, as described above. Otherwise, the client-side agent processes the request (step 606). In step 606, the request may be processed in a number of ways. For example, the client-side agent may retrieve the information requested, process at least a portion of the information, perform a number of operations using the information, and/or process the request in some other suitable manner.

Thereafter, the client-side agent sends a response with the information requested to the server-side agent (step 608), with the process then returning to step 602 as described above.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts and combinations of blocks in the block diagrams and/or flowcharts can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer usable or computer readable medium providing program code for use by or in connection with a computer or any instruction system. For the purposes of this description, a computer usable or computer readable medium can be any tangible apparatus that can contain, store, communicate, propagate, or transport the program for use by or in connection with the instruction system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual running of the program code, bulk storage, and cache memories, which provide temporary storage of at least some program code in order to reduce the number of times code must be retrieved from bulk storage during running of the program code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening networks. Modems, cable modem, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing information, the method comprising:
    establishing a session between a client-side agent running on a client data processing system and a server-side agent running on a data processing system;
    monitoring, by the server-side agent for a selected event in an application running in the session for processing by the server-side agent;
    detecting, by the server-side agent, the selected event for processing by the server side agent;
    based on the detecting, requesting, by the server-side agent, information to process the selected event from the client-side agent,
        wherein the server-side agent performs a subset of functions performed by the client-side agent; and
    receiving, by the server-side agent, a response with the information to process the selected event from the client-side agent;
    based on the response, performing, by the server-side agent, a set of steps included in the subset of functions to process the selected event using the information received from the client-side agent.

2. The method of claim 1, wherein the step of monitoring, by the server-side agent running on the server data processing system, for the selected event for processing by the server-side agent comprises:
    monitoring, by the server-side agent running on the server data processing system, a session on the server data processing system for the selected event occurring in the session for processing by the server-side-agent, wherein the selected event includes a request for information and the request for information is sent by the server-side agent to the client-side agent.

3. The method of claim 1 further comprising:
    establishing a communications channel between the server-side agent and the client-side agent, wherein the server-side agent is a smaller version of the client-side agent that has less functionality than the client-side agent.

4. The method of claim 2, wherein the server-side agent performs a single sign on for applications in the session and wherein the selected event is an attempt to access an application requiring a user identifier and a password.

5. The method of claim 1, wherein the server-side agent uses fewer resources than the client-side agent.

6. The method of claim 1, wherein the server-side agent takes less time to start up as compared to the client-side agent.

7. The method of claim 1, wherein the client-side agent loads data into a memory on the client data processing system, wherein the data is used to provide the information to the server-side agent.

8. The method of claim 1, wherein the client-side agent performs steps to process data stored on the client data processing system to generate the information requested by the server-side agent.

9. The method of claim 7, wherein the data comprises a policy for a single sign-on service.

10. A method for processing information, the method comprising:
    establishing a session between a client-side agent running on a client data processing system and a server-side agent running on a server data processing system;
    receiving, by the client-side agent, a request for information from the server-side agent,
        wherein the server-side agent monitors for a selected event in an application running in the session for processing by the server-side agent and sends the request for information based on detecting the selected event, and
        wherein the server-side agent performs a subset of functions performed by the client-side agent;
    based on receiving, by the client-side agent, the request for information, performing, by the client-side agent, a set of steps to obtain the information;
    sending, by the client-side agent, a response including the information to the server-side agent,
        wherein, based on the response, the server-side agent performs a set of steps included in the subset of functions to process the selected event using the information sent by the client-side agent.

11. The method of claim 10, wherein the client-side agent receives requests for the information from a plurality of server-side agents running on a plurality of server data processing systems.

12. A data processing system comprising:
    a bus;
    a communications unit connected to the bus;
    a storage device connected to the bus, wherein the storage device includes program code, the program code for executing a server-side agent; and
    a processor unit connected to the bus, wherein the processor unit runs the program code to perform a method, the method comprising:
        establishing a session between the server-side agent and a client-side agent running on a client data processing system;
        monitoring, by the server-side agent, for a selected event in an application running in the session for processing by the server-side agent;
        detecting, by the server-side agent, the selected event for processing by the server side agent;
        based on the detecting, requesting, by the server-side agent, information to process the selected event from the client-side agent,
            wherein the server-side agent performs a subset of functions performed by the client-side agent; and
        receiving, by the server-side agent, a response with the information to process the selected event from the client-side agent;
        based on the response, performing, by the server-side agent, a set of steps included in the subset of functions to process the selected event using the information received from the client-side agent.

13. The data processing system of claim 12, wherein in running the program code to monitor for the selected event for processing by the server-side agent, the processor unit runs the program code to monitor a session on the server data processing system for the selected event occurring in the session for processing by the server-side-agent, wherein the selected event includes a request for information and the request for information is sent by the server-side agent to the client-side agent.

14. The data processing system of claim 12 further comprising:
establishing a communications channel between the server-side agent and the client-side agent, wherein the server-side agent is a smaller version of the client-side agent that has less functionality than the client-side agent.

15. A computer program product for processing information comprising:
a computer recordable storage device; and
program code, stored on the tangible computer recordable storage device, the program code for, when executed by a processor, performing a method, the method comprising:
establishing a session between a server-side agent running on a server data processing system and a client-side agent running on a client data processing system;
monitoring, by the server-side agent, for a selected event in an application running in the session for processing by the server-side agent;
detecting, by the server-side agent, the selected event for processing by the server side agent;
based on the detecting, requesting, by the server-side agent, information to process the selected event from the client-side agent,
wherein the server-side agent performs a subset of functions performed by the client-side agent; and
receiving, by the server-side agent, a response with the information to process the selected event from the client-side agent;
based on the response, performing, by the server-side agent, a set of steps included in the subset of functions to process the selected event using the information received from the client-side agent.

16. The computer program product of claim 15, wherein program code, stored on the tangible computer recordable storage device, for monitoring for the selected event for processing by the server-side agent comprises:
program code, stored on the tangible computer recordable storage device, for monitoring a session on the server data processing system for the selected event occurring in the session for processing by the server-side-agent, wherein the selected event includes a request for information and the request for information is sent by the server-side agent to the client-side agent.

17. The computer program product of claim 15 further comprising:
program code, stored on the tangible computer recordable storage device, for establishing a communications channel between the server-side agent and the client-side agent, wherein the server-side agent is a smaller version of the client-side agent that has less functionality than the client-side agent.

18. The computer program product of claim 16, wherein the server-side agent performs a single sign on for applications in the session and wherein the selected event is an attempt to access an application requiring a user identifier and a password.

19. The computer program product of claim 15, wherein the server-side agent uses fewer resources than the client-side agent.

20. The computer program product of claim 15, wherein the server-side agent takes less time to start up as compared to the client-side agent.

21. The computer program product of claim 15, wherein the client-side agent loads data into a memory on the client data processing system, wherein the data is used to provide the information to the server-side agent.

22. The computer program product of claim 15, wherein the client-side agent performs steps to process data stored on the client data processing system to generate the information requested by the server-side agent.

23. The computer program product of claim 21, wherein the data comprises at least one of a policy for a single sign-on service, single sign-on (SSO) specifications, credentials for a user application, access control lists, and virus signatures.

24. The computer program product of claim 15, wherein the program code is stored on the tangible computer recordable storage device in a data processing system, and wherein the program code is downloaded over a network from a remote data processing system to the data processing system.

25. The computer program product of claim 15, wherein the program code is stored on the tangible computer recordable storage device in the server data processing system, and wherein the program code is downloaded over a network to a remote data processing system for use in a second tangible computer recordable storage device with the remote data processing system.

* * * * *